US010573075B2

United States Patent
Zhao

(10) Patent No.: US 10,573,075 B2
(45) Date of Patent: Feb. 25, 2020

(54) RENDERING METHOD IN AR SCENE, PROCESSOR AND AR GLASSES

(71) Applicant: BOE TECHNOLOGY GROUP CO., LTD., Beijing (CN)

(72) Inventor: Xingxing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 37 days.

(21) Appl. No.: 15/544,908

(22) PCT Filed: Feb. 28, 2017

(86) PCT No.: PCT/CN2017/075090
§ 371 (c)(1),
(2) Date: Jul. 20, 2017

(87) PCT Pub. No.: WO2017/197951
PCT Pub. Date: Nov. 23, 2017

(65) Prior Publication Data
US 2018/0218539 A1  Aug. 2, 2018

(30) Foreign Application Priority Data
May 19, 2016  (CN) .......................... 2016 1 0339329

(51) Int. Cl.
*G09G 5/00*  (2006.01)
*G06T 19/00*  (2011.01)
(Continued)

(52) U.S. Cl.
CPC .......... *G06T 19/006* (2013.01); *G06T 15/005* (2013.01); *G06T 15/40* (2013.01); *G06T 15/506* (2013.01)

(58) Field of Classification Search
CPC ....... G06T 19/006; G06T 19/00; G06F 3/011; G06F 3/012; G02B 27/017
(Continued)

(56) References Cited

U.S. PATENT DOCUMENTS 9,286,725 B2  3/2016  Vasquez, II et al.
9,529,424 B2  12/2016  Hilliges et al.
(Continued)

FOREIGN PATENT DOCUMENTS

CN  101727182 A  6/2010
CN  102129708 A  7/2011
(Continued)

OTHER PUBLICATIONS

First Office Action for Chinese Patent Application No. 201610339329.X dated Apr. 4, 2018.
(Continued)

*Primary Examiner* — Gordon G Liu
(74) *Attorney, Agent, or Firm* — Calfee, Halter & Griswold LLP

(57) ABSTRACT

Embodiments of the present disclosure provide a rendering method in an AR scene, the method includes: creating a virtual scene including a virtual object; obtaining depth information of a real shielding object and generating a grid map; creating a shielding object virtual model of the real shielding object in the virtual scene; and setting a property of the shielding object virtual model to be absorbing light, and rendering the shielding object virtual model. The present disclosure further provides a processor and AR glasses.

8 Claims, 3 Drawing Sheets

(51) Int. Cl.
*G06T 15/50* (2011.01)
*G06T 15/40* (2011.01)
*G06T 15/00* (2011.01)

(58) Field of Classification Search
USPC .................................................. 345/633
See application file for complete search history.

(56) References Cited

U.S. PATENT DOCUMENTS

| | | | |
|---|---|---|---|
| 2008/0218515 | A1* | 9/2008 | Fukushima ........... G06T 19/006 345/424 |
| 2012/0113140 | A1 | 5/2012 | Hilliges et al. |
| 2013/0208004 | A1* | 8/2013 | Hamada ................ G06T 19/006 345/633 |
| 2014/0168217 | A1 | 6/2014 | Kim et al. |
| 2014/0192164 | A1* | 7/2014 | Tenn .................. H04N 13/0242 348/47 |
| 2014/0240354 | A1 | 8/2014 | Ma et al. |
| 2015/0130790 | A1* | 5/2015 | Vasquez, II ........... G06T 19/006 345/419 |
| 2018/0068488 | A1* | 3/2018 | Hart ........................ G06F 3/011 |

FOREIGN PATENT DOCUMENTS

| | | |
|---|---|---|
| CN | 102156810 A | 8/2011 |
| CN | 102306088 A | 1/2012 |
| CN | 102722249 A | 10/2012 |
| CN | 103489214 A | 1/2014 |
| CN | 103871106 A | 6/2014 |
| CN | 103955267 A | 7/2014 |
| CN | 104504671 A | 4/2015 |
| CN | 106056663 A | 10/2016 |

OTHER PUBLICATIONS

International Search Report for PCT Application No. PCT/CN2017/075090 dated May 3, 2017.

Yutao Wang research on AR-based Collaborative Assembly System, Chinese Selected Master's These Full-Text Databases, Engineering Technology Edition 1, Jan. 15, 2011, No. 1 ISSN:1674-0246 pp. 15-16 and 26-32.

Second Office Action for Chinese Patent Application No. 201610339329.X dated Nov. 15, 2018.

Yu Wen-Jiong, et al., "Occlusion identification research between virtual and real object in augment reality," Application Research of Computers, vol. 26. No. 9. Sep. 2009.

\* cited by examiner

RENDERING METHOD IN AR SCENE, PROCESSOR AND AR GLASSES

CROSS REFERENCE

The present application is based upon International Application No. PCT/CN2017/075090, filed on Feb. 28, 2017, which is based upon and claims priority to Chinese Patent Application No. 201610339329.X, filed on May 19, 2016, and the entire contents thereof are incorporated herein by reference.

TECHNICAL FIELD

The present disclosure relates to the field of virtual display, in particular, to a rendering method combining virtual and reality in an augmented reality (AR) scene, a processor for performing the rendering method and AR glasses including the processor.

BACKGROUND

In the AR glasses, a depth detector is generally used to add information over the real scene. If the virtual information is added without considering the special position relation between the virtual object and the real object, the position (shielding) relation reflected by the transparency of the objects in the resulting augmented image may be different from the user's conventional experience, resulting in a visual error and thus affecting the user experience.

It should be noted that, information disclosed in the above background portion is provided only for better understanding of the background of the present disclosure, and thus it may contain information that does not form the prior art known by those ordinary skilled in the art.

SUMMARY

The present disclosure provides a rendering method combining virtual and reality in an AR scene, a processor for performing the rendering method and AR glasses including the processor.

According to at least one embodiment, the present disclosure provides a rendering method in an AR scene including:

creating a virtual scene including a virtual object;

obtaining depth information of a real shielding object and generating a grid map;

creating a shielding object virtual model of the real shielding object in the virtual scene; and setting a property of the shielding object virtual model to be absorbing light, and rendering the shielding object virtual model.

As another aspect of the present disclosure, there is provided a processor for AR glasses including:

a grid map generating unit configured to generate a grid map according to depth information of a real shielding object;

a virtual scene creating unit configured to create a virtual scene and add a virtual object model in the virtual scene;

a shielding object virtual model creating unit configured to create a shielding object virtual model of the real shielding object in the virtual scene, and a property of the shielding object virtual model is set to be absorbing light; and a rendering unit configured to render the virtual object model and the shielding object virtual model respectively, according to a property of the virtual object model and the property of the shielding object virtual model.

As a further aspect of the present disclosure, there is further provided AR glasses including the above processor according to the present disclosure.

It is to be understood that both the foregoing general description and the following detailed description are exemplary and explanatory only and are not restrictive of the invention, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The accompanying drawings are provided for a further understanding of the present disclosure and constitute a part of the specification, and together with the following detailed description, serve to illustrate the present disclosure, but are not to be construed as limiting the present disclosure. In the drawings.

DETAILED DESCRIPTION

Hereinafter, particular implementations according to the present disclosure will be described in detail with reference to the accompanying drawings. It should be appreciated that the particular implementations described herein are merely provided for describing and explaining the present disclosure, and are not intended to limit the present disclosure.

Figure 1:
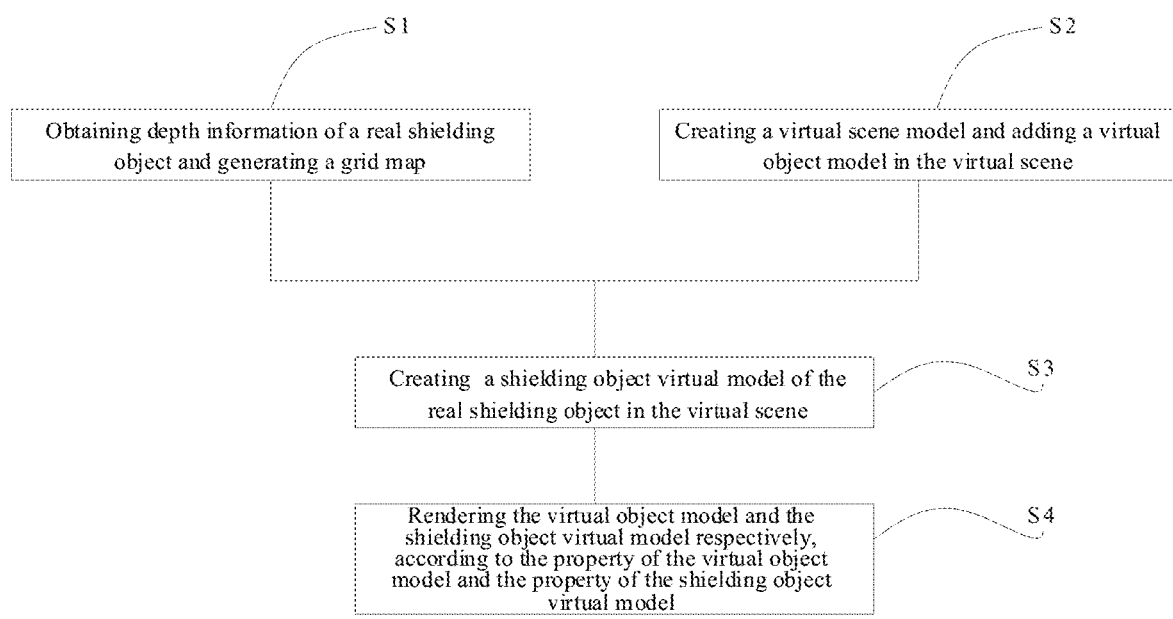
FIG. 1 is a flow chart of the rendering method in an AR scene according to the present disclosure.

As an aspect of the present disclosure, there is provided a rendering method in an AR scene. As illustrated in FIG. 1, the rendering method includes the steps that follow.

In step S1, a virtual scene including a virtual object is created.

In step S2, depth information of a real shielding object is obtained and a grid map is generated.

In step S3, a shielding object virtual model of the real shielding object is created in the virtual object.

In step S4, the property of the shielding object virtual model is set to be absorbing light, and the shielding object virtual model is rendered.

It should be noted that, while executing the rendering method provided by the present disclosure, the order of the steps between steps S1 and S2 is not specifically defined. For example, steps S1 and S2 may be executed at the same time, or step S1 may be executed first, or step S2 may be executed first.

The virtual object model is an object that is virtually displayed in an AR scene. For example, in the embodiment shown in FIG. 2, the virtual object model is a teapot. The real shielding object refers to a real object located in front of the virtual object model in the viewpoint coordinate. In the embodiment shown in FIG. 2, the real shielding object is a human hand.

In the rendering method according to the present disclosure, by creating a virtual model for the real shielding object and introducing the shielding object virtual model into the virtual scene, and rendering the shielding object virtual model using the property of absorbing light, a shielding object virtual model having a shape and position corresponding to the real shielding object is present in the virtual scene. The shielding object virtual model provides a visual shielding effect, i.e., any scene or object behind the shielding object virtual model will not be presented. Since the real shielding object overlaps with the shielding object virtual model in the virtual scene, while watching through AR glasses, the user will see the appearance of the real shielding object and may experience the shielding effect that meets the daily senses. In other words, the user will not see any scene and/or object behind the real shielding object, thereby intuitively understanding the special positional relation between the real shielding object and the virtual object.

In at least one embodiment of the present disclosure, there is no particular restriction on how to perform step S1. For example, the step S1 may be implemented using a particular AR application. For example, in the specific embodiment illustrated in FIG. 3, the virtual object model includes a teapot, and it is possible to add the teapot in the virtual scene using the tools such as OpenGL, Unity 3D or the like, adjust the angle and size of the teapot according to the virtual scene, and perform a 3-dimensional registration.

In at least one embodiment of the present disclosure, the step S3 may include the steps that follow.

In step S31, a viewpoint coordinate of the real shielding object is obtained based on the depth information of the real shielding object.

In step S32, the shielding object virtual model of the real shielding object is created according to the viewpoint coordinate of the real shielding object.

One real object may be represented using two kinds of coordinates, one of which is the world coordinate, and the other one is the viewpoint coordinate. One virtual object may also represented using two kinds of coordinates, one of which is the virtual scene coordinate, and the other one is the viewpoint coordinate. The so-called viewpoint coordinate refers to a coordinate system based on the position of the AR glasses or the user's eye.

In the step S32, by creating the shielding object virtual model of the real shielding object in the viewpoint coordinate, it will be unnecessary to further convert the coordinate. Accordingly, the method according to the present disclosure is more effective.

In at least one embodiment of the present disclosure, there is no particular restriction on how to perform step S2. For example, the step S2 may include the steps that follow.

In step S21, a real scene is captured using a depth camera, and the real shielding object is identified.

In step S22, a scatter diagram of the real shielding object is obtained according to the depth information of the real shielding object.

In step S23, the scatter diagram of the real shielding object is converted to the grid map of the real shielding object.

Generally, the AR glasses are equipped with the depth camera. Accordingly, it is possible to conveniently and quickly obtain the grid map of the real shielding object according to the method provided in at least one embodiment of the present disclosure.

Figure 2:
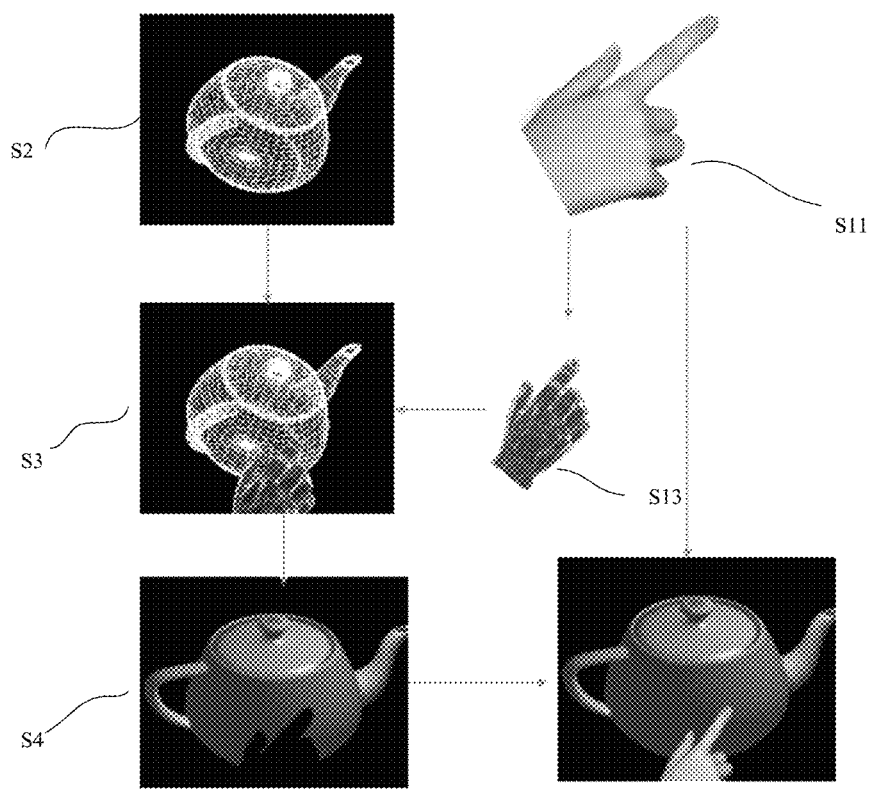
FIG. 2 is a flow chart of rendering a virtual teapot using the rendering method according to the present disclosure.

Hereinafter, a specific flow chart of the rendering method according to at least one embodiment of the present disclosure will be described with reference to FIG. 2. As illustrated in FIG. 2, the virtual object model is a teapot, and the shielding object is a human hand.

In step S21, a real scene is captured using a depth camera, and a human hand is identified.

In step S22, a scatter diagram (not shown) of the human hand is obtained according to the depth information of the human hand.

In step S23, the scatter diagram of the human hand is converted to a grid map of the real shielding object.

In step S1, a virtual scene model is created, and a virtual object model (i.e., the teapot) is added in the virtual scene.

In step S31, the depth information of the human hand is unified as a viewpoint coordinate.

In step S32, the shielding object virtual model of the real shielding object is created according to the viewpoint coordinate of the human hand.

In step S4, the shielding object virtual model is rendered according to a property of absorbing light.

Finally, the rendering at the lower right corner may be obtained, from which the special position relation between the human hand and the teapot may be clearly understood, and the display effect is more real.

Figure 3:
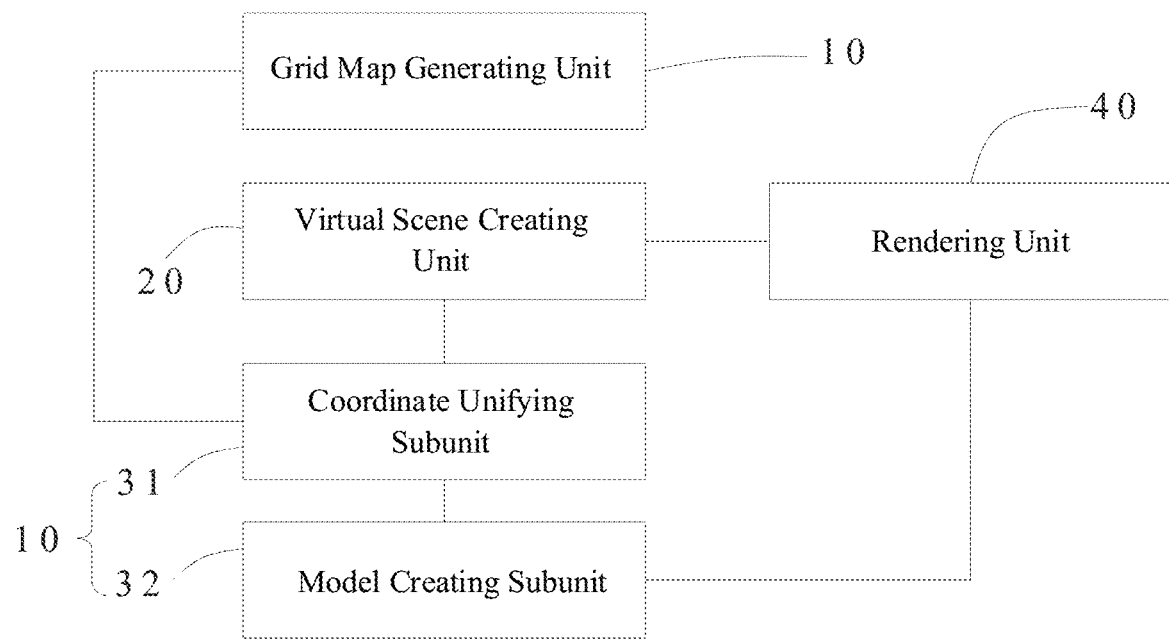
FIG. 3 is a schematic view of the processor according to the present disclosure.

As another aspect of the present disclosure, there is provided a processor for AR glasses. As illustrated in FIG. 3, the processor includes the following units.

A grid map generating unit 10 is configured to generate a grid map according to depth information of a real shielding object.

A virtual scene creating unit 20 is configured to create a virtual scene including a virtual object.

A shielding object virtual model creating unit 30 is configured to create a shielding object virtual model of the real shielding object in the virtual scene.

A rendering unit 40 is configured to set a property of the shielding object virtual model to be absorbing light, and render the shielding object virtual model.

The grid map generating unit 10 is configured to perform the step S2, the virtual scene creating unit 20 is configured to perform the step S1, the shielding object virtual model creating unit 30 is configured to perform the step S3, and the rendering unit 40 is configured to perform the step S4.

In at least one embodiment of the present disclosure, the virtual model creating unit 30 includes the following subunits.

A coordinate unifying subunit 31 is configured to obtain a viewpoint coordinate of the real shielding object according to the depth information of the real shielding object.

A model creating subunit 32 is configured to create the shielding object virtual model of the real shielding object in the virtual scene according to the viewpoint coordinate of the real shielding object.

In at least one embodiment of the present disclosure, the grid map generating unit 10 is configured to obtain a scatter diagram of the real shielding object according to the depth information of the real shielding object, and convert the scatter diagram into the grid map.

As a further aspect of the present disclosure, there is provided AR glasses including a processor, wherein the processor is the above processor according to the present disclosure.

In at least one embodiment of the present disclosure, the AR glasses further include a depth camera for capturing the scatter diagram of the real shielding object, and the depth camera is connected to an input terminal of the grid map generating unit.

In the rendering method according to the at least one embodiment of the present disclosure, by creating a virtual model for the real shielding object and introducing the shielding object virtual model into the virtual scene, and rendering the shielding object virtual model using the property of absorbing light, a shielding object virtual model having a shape and position corresponding to the real shielding object is present in the virtual scene. The shielding object virtual model provides a visual shielding effect, i.e., any scene or object behind the shielding object virtual model will not be presented. Since the real shielding object overlaps with the shielding object virtual model in the virtual scene, while watching through AR glasses, the user will see the appearance of the real shielding object and may experience the shielding effect that meets the daily senses. In other words, the user will not see any scene and/or object behind the real shielding object, thereby intuitively understanding the special positional relation between the real shielding object and the virtual object.

It should be appreciated that, the above embodiments are exemplary implementations for illustrating the principle of the present disclosure only, while the present disclosure is not limited thereto. Various modifications and improvements are possible to those of ordinary skill in the art without departing from the spirit and essence of the present disclosure. All these modifications and improvements will also fall into the protection scope of the present disclosure.

What is claimed is:

1. A rendering method in an AR scene comprising:
   creating a virtual scene comprising a virtual object;
   obtaining depth information of a real shielding object and generating a grid map;
   creating a shielding object virtual model of the real shielding object having a shape and position corresponding to the real shielding object in the virtual scene; and
   setting a property of the shielding object virtual model to be absorbing light, and rendering the shielding object virtual model, such that any scene or object behind the shielding object virtual model will not be presented in a display device positioned between a user's position and the real shielding object,
   wherein the real shielding object is an object directly visible in a real scene.

2. The rendering method according to claim 1, wherein the step of creating a virtual model of the real shielding object in the virtual scene comprises:
   obtaining a viewpoint coordinate of the real shielding object according to the depth information of the real shielding object; and
   creating the shielding object virtual model of the real shielding object according to the viewpoint coordinate of the real shielding object.

3. The rendering method according to claim 1, wherein the step of obtaining depth information of a real shielding object and generating a grid map comprises:
   capturing the real scene using a depth camera and identifying the real shielding object;
   obtaining a scatter diagram of the real shielding object according to the depth information of the real shielding object, and
   converting the scatter diagram of the real shielding object into the grid map of the real shielding object.

4. A processor for AR glasses comprising:
   a grid map generating unit configured to generate a grid map according to depth information of a real shielding object;
   a virtual scene creating unit configured to create a virtual scene comprising a virtual object;
   a shielding object virtual model creating unit configured to create a shielding object virtual model of the real shielding object having a shape and position corresponding to the real shielding object in the virtual scene; and
   a rendering unit configured to set a property of the shielding object virtual model to be absorbing light, and render the shielding object virtual model, such that any scene or object behind the shielding object virtual model will not be presented in a display device positioned between a user's position and the real shielding object,
   wherein the real shielding object is an object directly visible in a real scene.

5. The processor according to claim 4, wherein the shielding object virtual model creating unit comprises:
   a coordinate unifying subunit configured to obtain a viewpoint coordinate of the real shielding object according to the depth information of the real shielding object; and
   a model creating subunit configured to create the shielding object virtual model of the real shielding object in the virtual scene according to the viewpoint coordinate of the real shielding object.

6. The processor according to claim 4, wherein the grid map generating unit is configured to obtain a scatter diagram of the real shielding object according to the depth information of the real shielding object, and convert the scatter diagram into the grid map.

7. AR glasses comprising the processor according claim 4.

8. The AR glasses according to claim 7, further comprising a depth camera for capturing the scatter diagram of the real shielding object, and the depth camera is connected to an input terminal of the grid map generating unit.

* * * * *